United States Patent [19]
Dhillon et al.

[11] Patent Number: 5,273,498
[45] Date of Patent: Nov. 28, 1993

[54] DIFFERENTIAL MECHANISM

[75] Inventors: Jermanjit S. Dhillon, Rochester Hills; David A. Salvatori, South Lyon, both of Mich.

[73] Assignee: New Venture Gear, Inc., Troy, Mich.

[21] Appl. No.: 987,356

[22] Filed: Dec. 7, 1992

[51] Int. Cl.⁵ .................................. F16H 1/38
[52] U.S. Cl. .................................. 475/230
[58] Field of Search .......................... 475/230

[56] References Cited

U.S. PATENT DOCUMENTS

| | | | |
|---|---|---|---|
| 1,444,293 | 2/1923 | White | 475/230 X |
| 1,721,535 | 7/1929 | Taub | 475/230 X |
| 4,183,263 | 1/1980 | Osenbaugh | 74/606 R |
| 4,467,672 | 8/1984 | Lamy | 475/246 |
| 4,543,854 | 10/1985 | Roth | 475/243 |
| 4,722,244 | 2/1988 | Tsuchiya et al. | 475/230 |
| 4,762,024 | 8/1988 | Graft | 475/226 |
| 4,885,958 | 12/1989 | Stritzel | 475/227 |

FOREIGN PATENT DOCUMENTS 0246646  10/1987  Japan .................................. 475/230

*Primary Examiner*—Dirk Wright
*Attorney, Agent, or Firm*—Harness, Dickey & Pierce

[57] ABSTRACT

An improved arrangement for retaining a cross shaft within a differential gear mechanism is disclosed. The differential gear mechanism includes a differential casing supported for rotation about an axis. The cross shaft is disposed within the differential casing so as to be perpendicular to the axis of rotation. Semi-cylindrical slots are formed within facing surface portions of the cross shaft and the differential casing. Upon aligning the cross shaft slots and casing slots, a lock pin is inserted within the elongated cylindrical lock channel formed thereby, to retain the cross shaft within the differential gear mechanism.

9 Claims, 2 Drawing Sheets

DIFFERENTIAL MECHANISM

BACKGROUND OF THE INVENTION

The present invention relates generally to differential gear mechanisms and, more particularly, to an improved arrangement for retaining the cross shaft within the differential case.

As is known, differential gear mechanisms are incorporated into the drive system of motor vehicles for permitting relative rotation between the wheels, while concomitantly supplying motive power thereto. As shown in FIG. 1, a conventional differential gear mechanism 10 typically includes an outer housing 12 and a differential carrier or casing 14 that is rotatably supported by bearings 15 for rotation within outer housing 12. Differential casing 14 has an enlarged interior chamber 16 and a pair of polar apertures 18 in communication therewith. An elongated cross shaft 20 extends through interior chamber 16 and has its opposite ends disposed within polar apertures 18. In addition, a pinion gear 22 is rotatably supported on each end of cross shaft 20 within interior chamber 16. Moreover, a pair of side gears 24 are also retained within interior chamber 16 and are each arranged in meshed engagement with pinion gears 22. Differential casing 14 is open at its opposite axial ends for receipt of a pair (i.e., left and right) axle half-shafts 26 which, in turn, are drivingly coupled to the wheels. As is known, each axle half-shaft 26 is fixed (i.e., splined) with a respective one of side gears 24 for rotation about an axis of rotation, denoted as Axis "A". A large ring gear 28 is secured to differential casing 14, such as by bolts 30 and is rotatably driven by a drive shaft (not shown) of the motor vehicle for delivering power through differential gear mechanism 10 to axle half-shafts 26 in a conventional manner.

To retain cross shaft 20 within differential casing 14, a locking pin 32 is inserted through a pair of alignable cylindrical bores 34 and 36 formed in differential casing 14 and cross shaft 20, respectively. As seen from FIGS. 1 and 2, cylindrical bore 36 extends through, and is symmetrical relative to, a central longitudinal axis "B" of cross shaft 20. However, it is known that during severe wheel slip situations, pinion gears 22 exert relatively large torque loads on cross shaft 20 which attempt to rotate cross shaft 20 within polar apertures 18. As such, the torque loading is transferred from locking pin 32 to differential casing 14 as a shear load. Accordingly, the cross-sectional area of locking pin 32 must be able to withstand such shear loads for retaining cross shaft 20 within differential casing 14. Unfortunately, if the torque loading causes locking pin 32 to shear, then cross shaft 20 would be free to slide out of differential casing 14, whereby differential gear mechanism 10 would become inoperative.

It is also known that conventional cross shaft retaining arrangements commonly require additional machining operations and/or an increase in the number of components, each of which tend to increase the overall complexity and cost of the differential gear mechanism. Moreover, special tools are often required to assemble and disassemble such differential gear mechanisms which are cumbersome to use and/or require an excessive amount of manual manipulation. Accordingly, it is the purpose of the present invention to solve these and other problems typically associated with conventional locking arrangements by providing an improved means for retaining a cross shaft with the differential casing of a differential gear mechanism.

SUMMARY OF THE INVENTION

Accordingly, it is a primary object of the present invention to provide a unique arrangement for securely retaining the cross shaft within the differential gear mechanism. As a related object, the improved arrangement for retaining the cross shaft also permits relatively simple and rapid assembly and disassembly of the differential gear mechanism.

It is a further object of the present invention to provide an improved arrangement for retaining the cross shaft within the differential gear mechanism which is effective in distributing the torque loading transferred from the cross shaft to the differential casing. In this manner, the present invention is designed to inhibit the premature and unintentional release of the cross shaft from the differential casing for providing increased reliability and service life characteristics.

In accordance with a preferred embodiment of the present invention, a differential gear mechanism includes a differential casing that is adapted to be rotatably driven about an axis of rotation. An elongated cross shaft is disposed within a pair of polar apertures formed in the differential casing such that the cross shaft extends perpendicular to the axis of rotation. A bore is formed in the differential casing which defines an elongated semi-cylindrical slot within one of the polar apertures. Furthermore, a second bore is formed in an edge surface of the cross shaft which defines a second elongated semi-cylindrical slot. The second semi-cylindrical slot is alignable with the first semi-cylindrical slot formed in the differential casing upon insertion of the cross shaft within the polar apertures to define an elongated cylindrical channel. The cylindrical channel is adapted to receive and retain a lock pin therein such that the cross shaft is fixedly retained within the differential gear mechanism. In this manner, the cross shaft is fixed for rotation with the differential casing, yet is inhibited from rotating within the polar apertures. Therefore, torque loads exerted on the cross shaft by the pinion gears are not transferred as shear loads onto the locking pin, but rather are transferred along the entire length of the locking pin to the differential casing.

Other objects and advantages of the present invention will become apparent to those skilled in the art from the following detailed description of the preferred embodiment, when read in light of the accompanying drawings and the appended claims.

DETAILED DESCRIPTION OF THE PREFERRED EMBODIMENT

Figure 1:
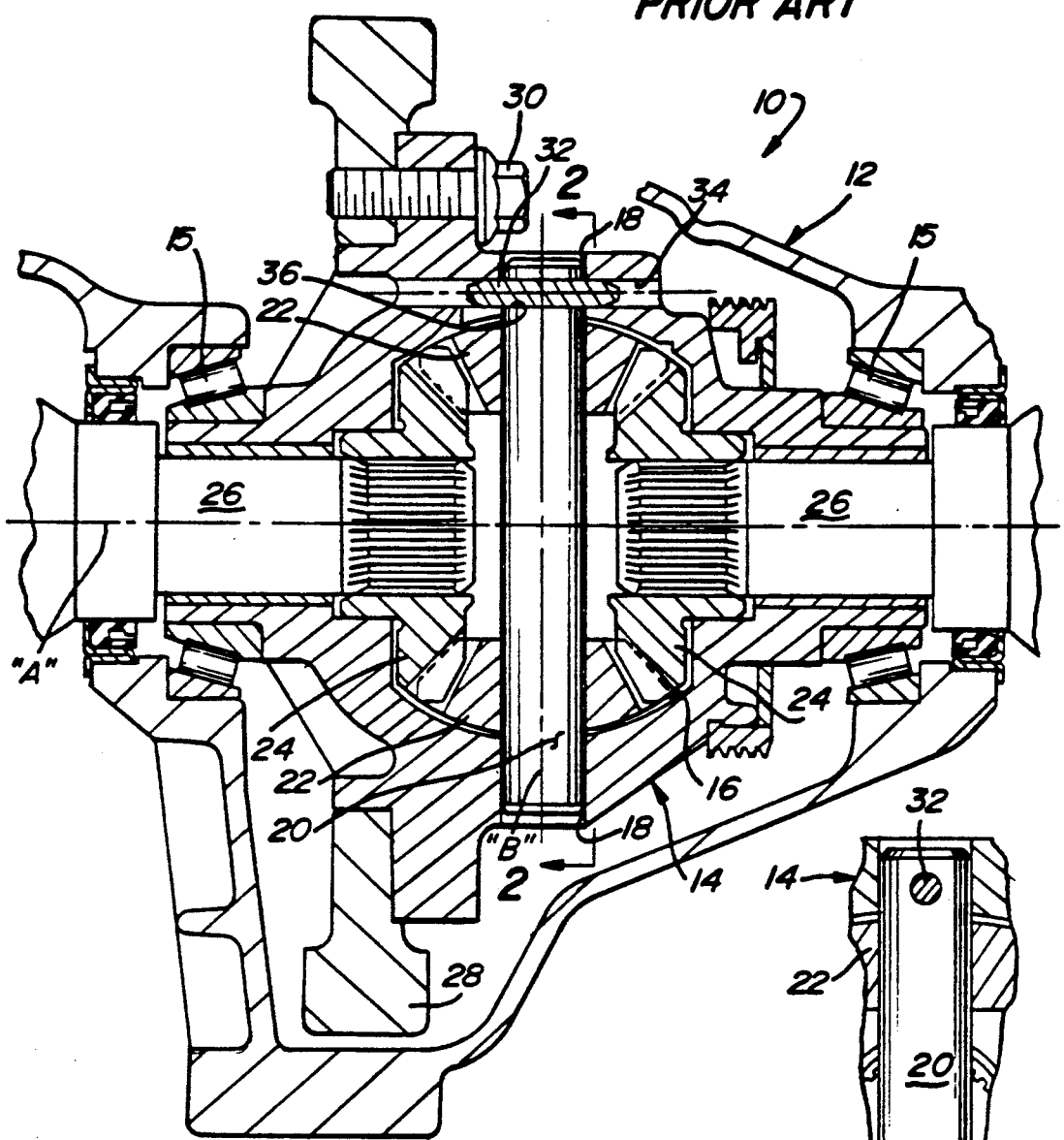
FIG. 1 is a sectional view of a conventional differential gear mechanism shown incorporated into a motor vehicle axle assembly.
Figure 2:
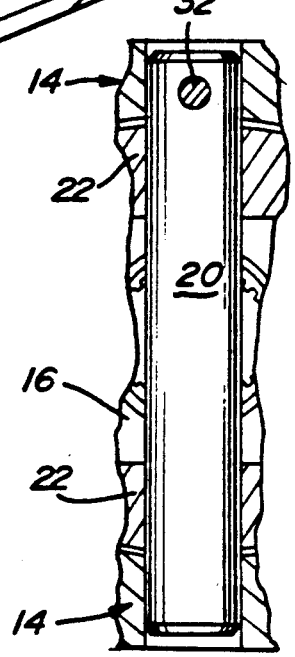
FIG. 2 is a partial sectional view, taken along line 2—2 of FIG. 1, showing the cross shaft locking arrangement associated with the conventional differential gear assembly.
Figure 3:
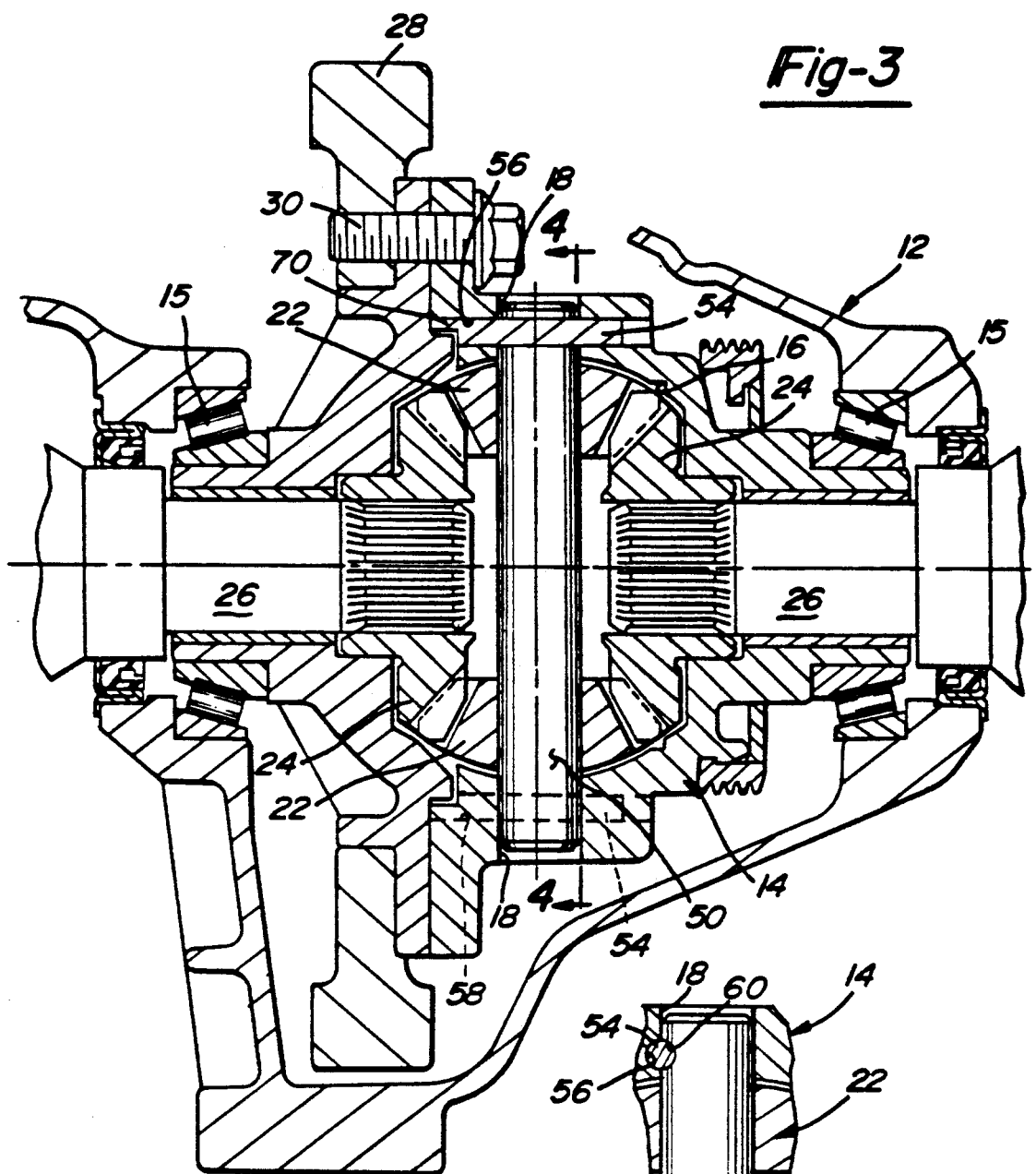
FIG. 3 is a sectional view of a differential gear mechanism having an improved cross shaft retaining arrangement according to a preferred embodiment of the present invention.
Figure 4:
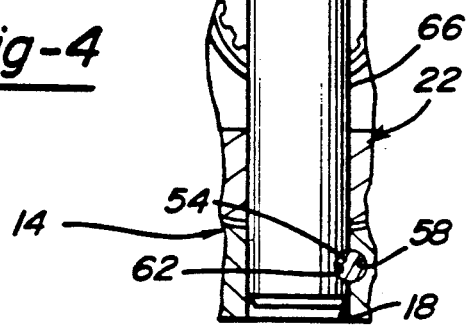
FIG. 4 is a partial sectional view taken along line 4—4 in FIG. 3, showing the improved retaining arrangement in greater detail.

With particular reference now to FIGS. 3 and 4, in which several previously described common components are designated by like numerals, an improved retaining arrangement is disclosed for retaining a cross shaft 50 within a differential gear mechanism 52. In general, the improved retaining arrangement includes at least one and, more preferably, two locking pins 54 that are inserted into a corresponding number of elongated channels formed at an interface between differential casing 14 and cross shaft 50. According to the preferred embodiment shown, two bores are formed in differential casing 14 which communicate with the peripheral edge of polar apertures 18 for defining elongated semi-cylindrical slots 56 and 58. Preferably, elongated slots 56 and 58 are equally-spaced radially from, and substantially parallel to, the rotational axis "A" of differential casing 14. More preferably, elongated slot 56 is formed in one lateral edge of a polar aperture while elongated slot 58 is formed in an opposite lateral edge of the other polar aperture. In addition, two elongated semi-cylindrical slots 60 and 62 are formed in opposite edge surfaces of cross shaft 50 adjacent its opposite ends. Slots 60 and 62 are likewise oriented such that when cross shaft 50 is inserted into polar apertures 18, the radial spacing therebetween with respect to the rotational axis "A" is equal to the spacing between elongated slots 56 and 58. As will be described, such an arrangement permits mating alignment of elongated slots 60 and 62 on cross shaft 50 with slots 56 and 58 in polar apertures 18, respectively, to define a pair of oppositely oriented elongated locking channels within which locking pins 54 are thereafter inserted. Furthermore, it will be appreciated that the radius of differential casing slots 56 and 58 is substantially identical to that of cross shaft slots 60 and 62.

As best seen from FIG. 3, elongated slot 60 is formed along one lateral edge 64 of cross shaft 50, while elongated slot 62 is formed along an opposite lateral edge 66 of cross shaft 50. Semi-cylindrical slots 56 and 58, formed within polar apertures 18 of differential casing 14, are alignable with semi-cylindrical slots 60 and 62, respectively, upon cross shaft 50 being slidably inserted into polar apertures 18. When the respective pairs of elongated semi-cylindrical slots are aligned, a pair of elongated cylindrical "locking" channels are formed between the adjacent contiguous surfaces of differential casing 14 and cross shaft 50 that are each sized to receive one of locking pins 54 therein. More specifically, the diameter of each locking pin 54 is slightly less than the diameter of the aligned cylindrical locking channel such that locking pin 54 fits snugly in its respective locking channel for inhibiting unintentional removal therefrom. Finally, locking pins 54 are also shown to have a notched end 70 which abuts a complimentary notched annular portion 72 formed in differential casing 14.

As will be appreciated, locking pins 54 coact with cross shaft 50 and differential casing 14 retain cross shaft 50 within differential gear mechanism 52 while concomitantly inhibiting rotation thereof within polar apertures 18. In addition, the utilization of complimentary slots which are alignable to define at least one of the elongated locking channels functions to inhibit the transfer of torque loading cross shaft 50 as "shear" loads on locking pins 54. Moreover, the torque loading acting on cross shaft 50 is effectively distributed along the length of locking pin 54, which results in substantially greater resistance to rotation of cross shaft 50 within polar apertures about the rotational axis "B".

Although slots 56, 58, 60 and 62 have been illustrated as being semi-cylindrical in cross-section, it will be understood that any suitable surface contour or profile could be utilized. Similarly, although locking pins 54 have been illustrated as being cylindrical in cross-section, any shape that is complimentary to the contour of the aligned locking channels for permitting sliding receipt therein can be utilized.

In accordance with the provisions of the patent statutes, the principles and mode of operation for the present invention have been explained and illustrated in its preferred embodiment. However, it will be appreciated by those skilled in the art that the present invention can be practiced otherwise than as specifically explained and illustrated without departing from its spirit or scope.

What is claimed is:

1. In a differential gear mechanism having a rotatable casing enclosing side gears in meshed engagement with pinion gears mounted on a cross shaft, opposite ends of the cross shaft being supported with polar apertures formed in the rotatable casing, the improvement comprising:

a first elongated slot formed in the rotatable casing that communicates with one of the polar apertures;

a second elongated slot formed in an edge portion of the cross shaft that is alignable with said first elongated slot to define a lock channel; and a locking pin disposed in said lock channel for retaining the cross shaft within the casing, said locking pin having a notched end which abuts a complimentary surface portion of the differential casing.

2. The invention defined in claim 1 wherein said first and second elongated slots are each semi-cylindrical so as to define an elongated cylindrical lock channel that is adapted to retain a cylindrical locking pin therein.

3. The invention defined in claim 1 further comprising a second lock channel formed adjacent the other of the polar apertures and in opposed relation to said first lock channel, and a second locking pin inserted into said second lock channel for retaining the opposite end of the cross shaft within the casing.

4. A differential gear mechanism comprising:

a casing adapted to be rotatably supported within an outer housing, said casing having an interior chamber formed therein and first and second polar apertures in communication with said interior chamber which open to the exterior of said casing, said first polar aperture having a first elongated slot formed in an edge surface thereof;

side gear means supported for rotation within said interior chamber of said casing;

axle means secured for rotation with said side gear means;

a cross shaft supported within said interior chamber of said casing and having its opposite ends disposed within said first and second polar apertures, a second elongated slot being formed in an edge surface of said cross shaft that is alignable with said first elongated slot to define an elongated lock channel;

pinion gear means rotatably mounted on said cross shaft and in meshed engagement with said side gear means; and pinion gear means rotatably mounted on said cross shaft and in meshed engagement with said side gear means; and a lock pin disposed within said elongated lock channel for retaining said cross shaft within said casing, said lock pin having a notched end adapted to abut a complimentary surface portion of said casing upon insertion into said elongated lock channel.

5. The differential gear mechanism of claim 4 wherein said first and second elongated slots are semi-cylindrical such that said elongated lock channel is cylindrical.

6. The differential gear mechanism of claim 4 further comprising a third elongated slot formed in an edge surface of said second polar aperture and a fourth elongated slot formed in an edge surface of said cross shaft, said third and fourth elongated slots being alignable to define a second elongated lock channel, and a second lock pin disposed in said second elongated lock channel.

7. The differential gear mechanism of claim 6 wherein said first and third elongated slots are formed in opposite lateral edge surfaces of their respective polar apertures, and said second and fourth elongated slots are formed in opposite lateral sides of said cross shaft such that upon insertion of said cross shaft into said polar apertures said first and second elongated lock channels are arranged in diagonally opposed relationship with respect to a centerline of said cross shaft.

8. A differential gear mechanism comprising:

a casing adapted to be rotatably supported within an outer housing, said casing having an interior chamber formed therein and first and second polar apertures in communication with said interior chamber which open to the exterior of said casing, each of said first and second polar apertures having first slot means formed in an edge surface thereof;

side gear means supported for rotation within said interior chamber of said casing;

axle means secured for rotation with said side gear means;

a cross shaft supported within said interior chamber of said casing and having its opposite ends disposed within said first and second polar apertures, said cross shaft having second slot means formed at each end thereof that is alignable with said first slot means to define a pair of elongated lock channels;

pinion gear means rotatably mounted on said cross shaft and in meshed engagement with said side gear means; and a lock pin disposed within each of said elongated lock channels for retaining said cross shaft within said casing, said lock pins having a notched end adapted to abut a complimentary surface portion of said casing upon insertion into said elongated lock channels.

9. The differential gear mechanism of claim 8 wherein said lock channels are arranged in diagonally opposed relationship with respect to a centerline of said cross shaft.

* * * * *